(12) United States Patent
Lindsey

(10) Patent No.: US 12,004,517 B2
(45) Date of Patent: Jun. 11, 2024

(54) PIPING BAG DISPENSER ASSEMBLY

(71) Applicant: Sharon Lindsey, Denton, TX (US)

(72) Inventor: Sharon Lindsey, Denton, TX (US)

( * ) Notice: Subject to any disclaimer, the term of this patent is extended or adjusted under 35 U.S.C. 154(b) by 323 days.

(21) Appl. No.: 17/543,949

(22) Filed: Dec. 7, 2021

(65) Prior Publication Data
US 2023/0172213 A1  Jun. 8, 2023

(51) Int. Cl.
*A21C 15/00* (2006.01)
*A23G 3/28* (2006.01)
*B65D 35/28* (2006.01)

(52) U.S. Cl.
CPC .............. *A21C 15/005* (2013.01); *A23G 3/28* (2013.01); *B65D 35/285* (2013.01)

(58) Field of Classification Search
CPC ........ B65D 35/285; A21C 15/005; A23G 3/28
See application file for complete search history.

(56) References Cited

U.S. PATENT DOCUMENTS

| | | | |
|---|---|---|---|
| 1,717,151 A | 6/1929 | Genova | |
| 2,686,614 A * | 8/1954 | Geressy | B65D 35/285 222/102 |
| 3,999,688 A * | 12/1976 | Hicks | B65D 35/285 222/102 |
| D393,574 S | 4/1998 | Perkins | |
| 6,460,481 B1 | 10/2002 | Young | |
| 6,799,611 B2 | 10/2004 | Dittmar | |
| 7,950,549 B1 | 5/2011 | Harris | |
| 8,434,644 B1 * | 5/2013 | Galante | B65D 35/285 222/102 |
| 8,701,938 B2 | 4/2014 | Darian | |
| 10,703,061 B1 * | 7/2020 | Hovhannisyan | B30B 3/04 |
| 2004/0232164 A1 * | 11/2004 | Bardeggia | B65D 35/285 222/102 |
| 2008/0041880 A1 | 2/2008 | Babineau | |
| 2010/0127016 A1 * | 5/2010 | Leung | B65D 35/28 222/102 |
| 2021/0292050 A1 * | 9/2021 | Tassias | B65D 35/40 |

FOREIGN PATENT DOCUMENTS

| | | | | |
|---|---|---|---|---|
| EP | 0153906 | * | 2/1985 | .......... B65D 35/285 |
| GB | 1364435 | * | 8/1974 | .......... B65D 35/285 |
| KR | 20220053468 | * | 4/2022 | .......... B65D 35/285 |
| WO | WO2004037707 | | 5/2004 | |

* cited by examiner

Primary Examiner — J C Jacyna

(57) ABSTRACT

A piping bag dispenser assembly includes a disk that has a receiver slot extending through the disk thereby facilitating a piping bag to be inserted through the receiver slot. A dispensing unit is rotatably integrated into the disk and the dispensing unit is aligned with the receiver slot. In this way the dispensing unit can frictionally engage the piping bag when the piping bag is inserted through the receiver slot. The dispensing unit urges the piping bag through the receiver slot when the dispensing unit is turned on. In this way the dispensing unit can urge icing outwardly through the piping bag for decorating a cake.

7 Claims, 4 Drawing Sheets

PIPING BAG DISPENSER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to dispenser devices and more particularly pertains to a new dispenser device for facilitating icing to be automatically squeezed from a piping bag. The device includes a disk with a receiver slot for insertably receiving a piping bag. The device includes a dispensing unit that is integrated into the disk and which squeezes the piping bag through the disk. In this way icing in the piping bag can be squeezed out of the piping bag for decorating a cake.

(2) Description of Related Art Including Information Disclosed Under 37 CFR 1.97 and 1.98

The prior art relates to dispenser devices including a piping bag device that including a plurality of compartments for storing a plurality of colors of icing. The prior art discloses a variety of icing dispensers that each includes a motor, a screw and a plunger for urging icing from piping bag. The prior art discloses an icing dispenser that includes a rack with a descending member for squeezing icing from a piping bag. The prior art discloses an icing dispenser that includes a cylinder and a manually operated plunger that is integrated into the cylinder for urging icing outwardly from the cylinder.

BRIEF SUMMARY OF THE INVENTION

An embodiment of the disclosure meets the needs presented above by generally comprising a disk that has a receiver slot extending through the disk thereby facilitating a piping bag to be inserted through the receiver slot. A dispensing unit is rotatably integrated into the disk and the dispensing unit is aligned with the receiver slot. In this way the dispensing unit can frictionally engage the piping bag when the piping bag is inserted through the receiver slot. The dispensing unit urges the piping bag through the receiver slot when the dispensing unit is turned on. In this way the dispensing unit can urge icing outwardly through the piping bag for decorating a cake.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
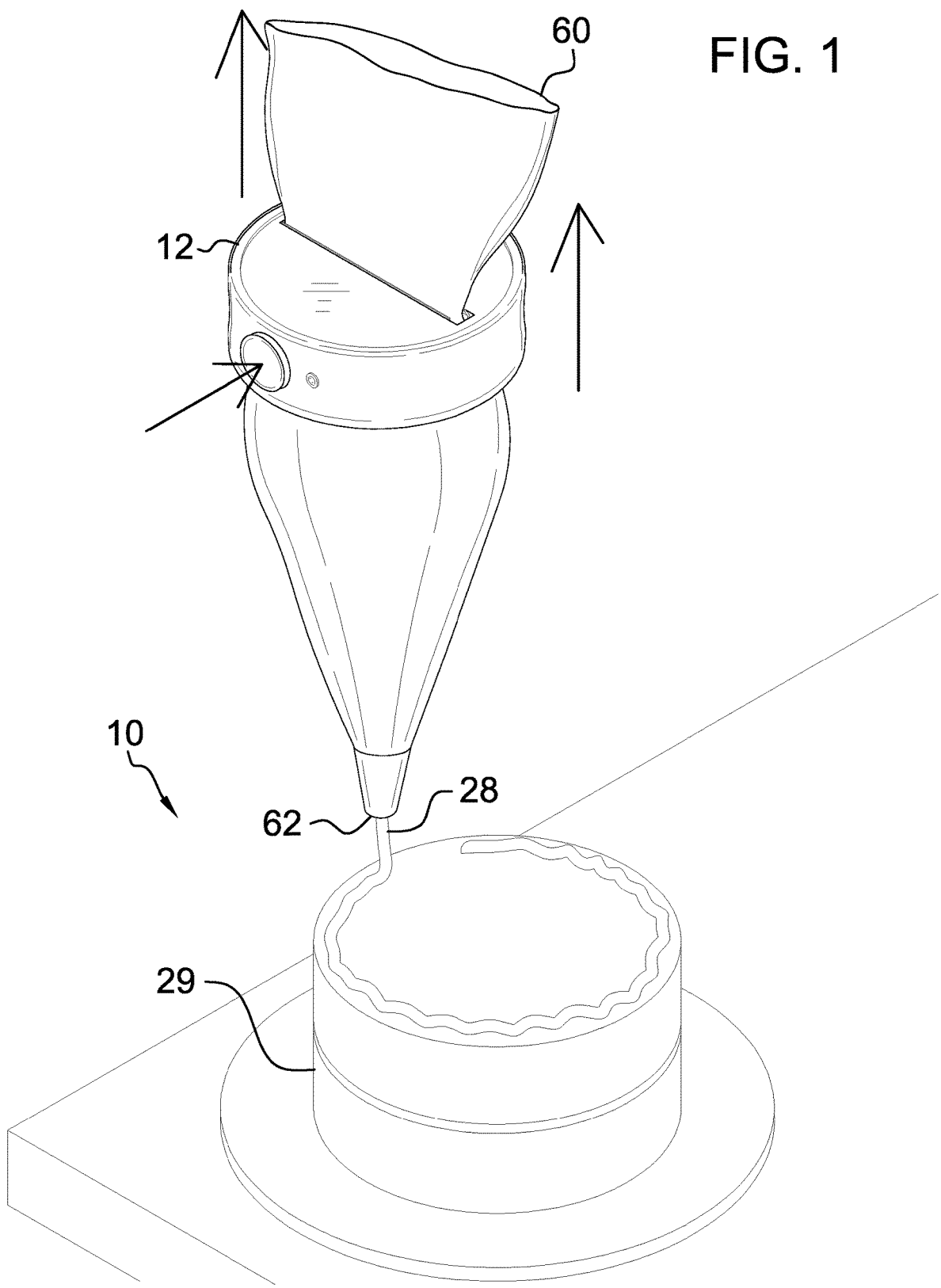
FIG. 1 is a perspective in-use view of a piping bag dispenser assembly according to an embodiment of the disclosure.
Figure 2:
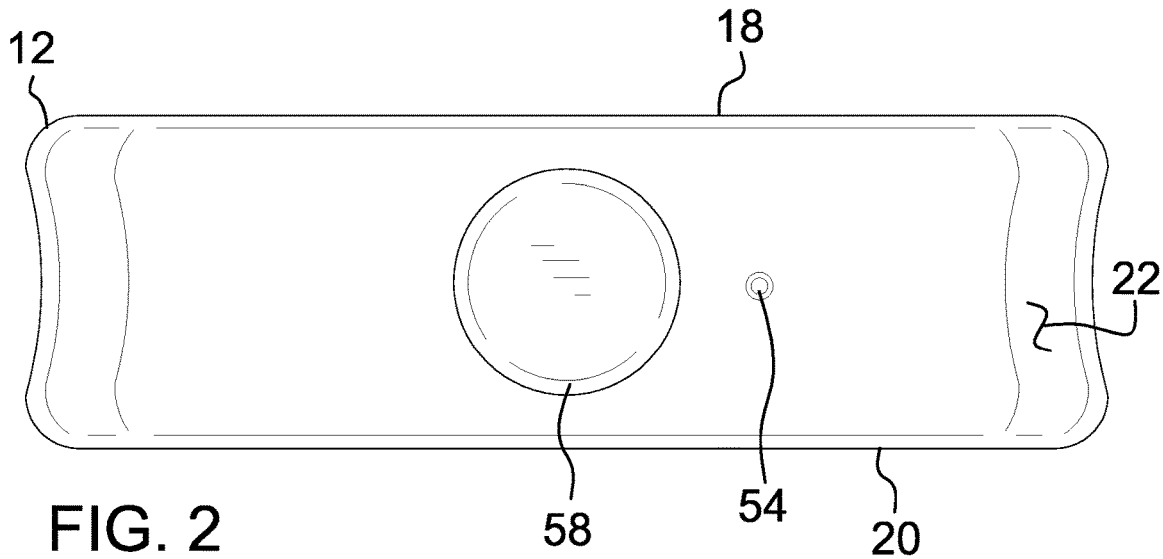
FIG. 2 is a front view of an embodiment of the disclosure.
Figure 3:
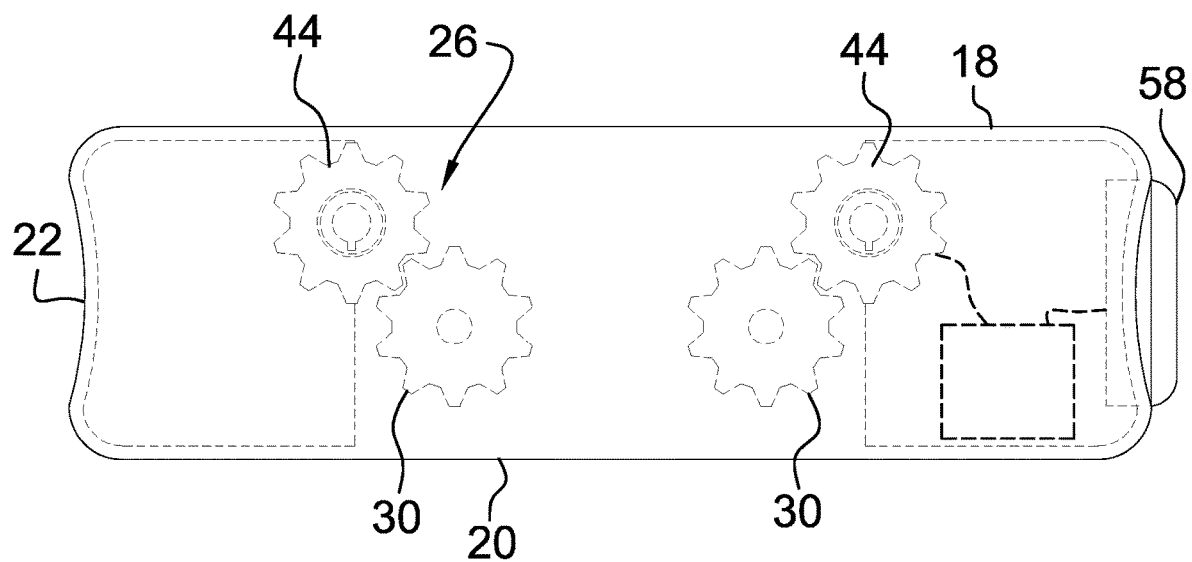
FIG. 3 is a right side phantom view of an embodiment of the disclosure.
Figure 4:
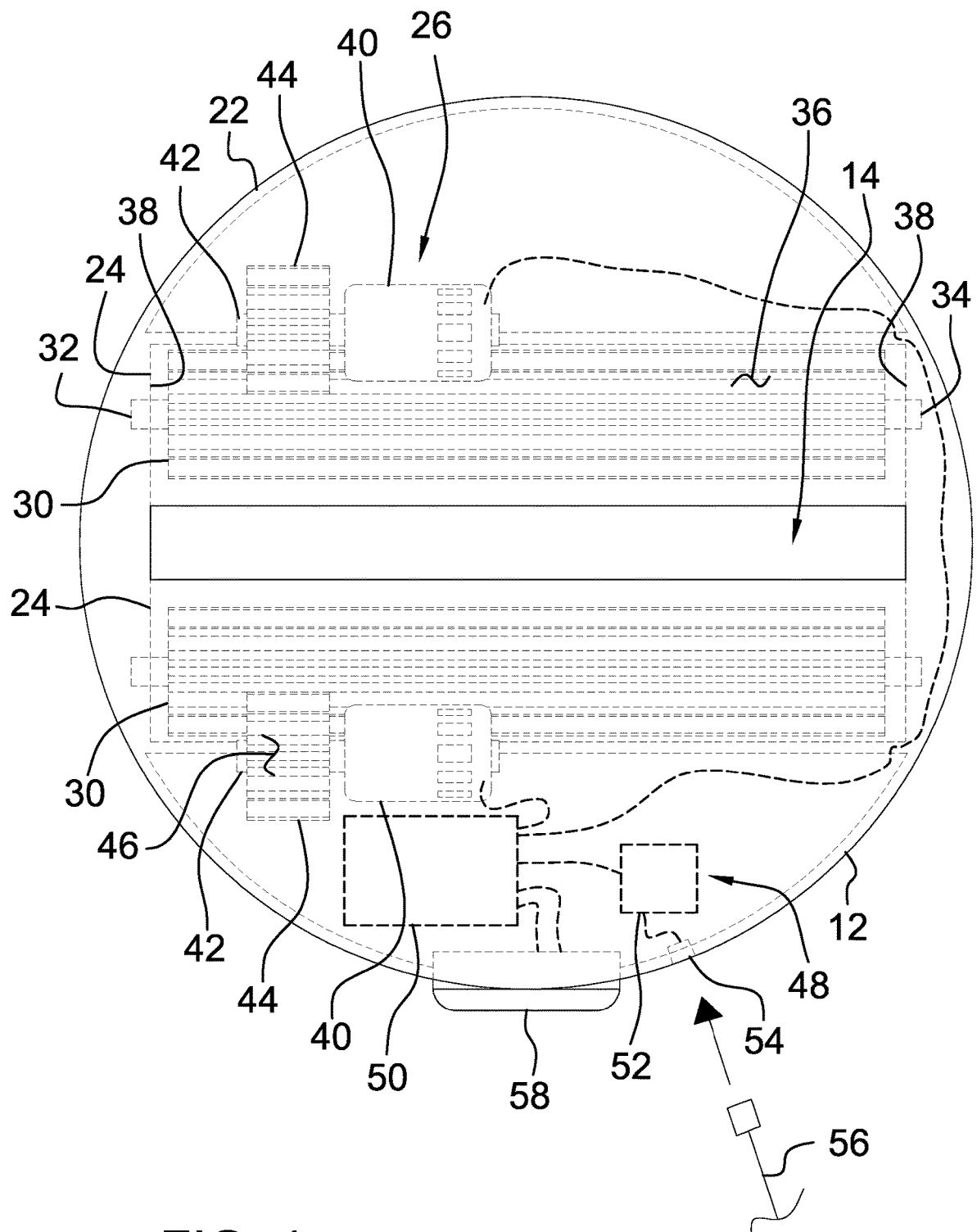
FIG. 4 is a top phantom view of an embodiment of the disclosure.
Figure 5:
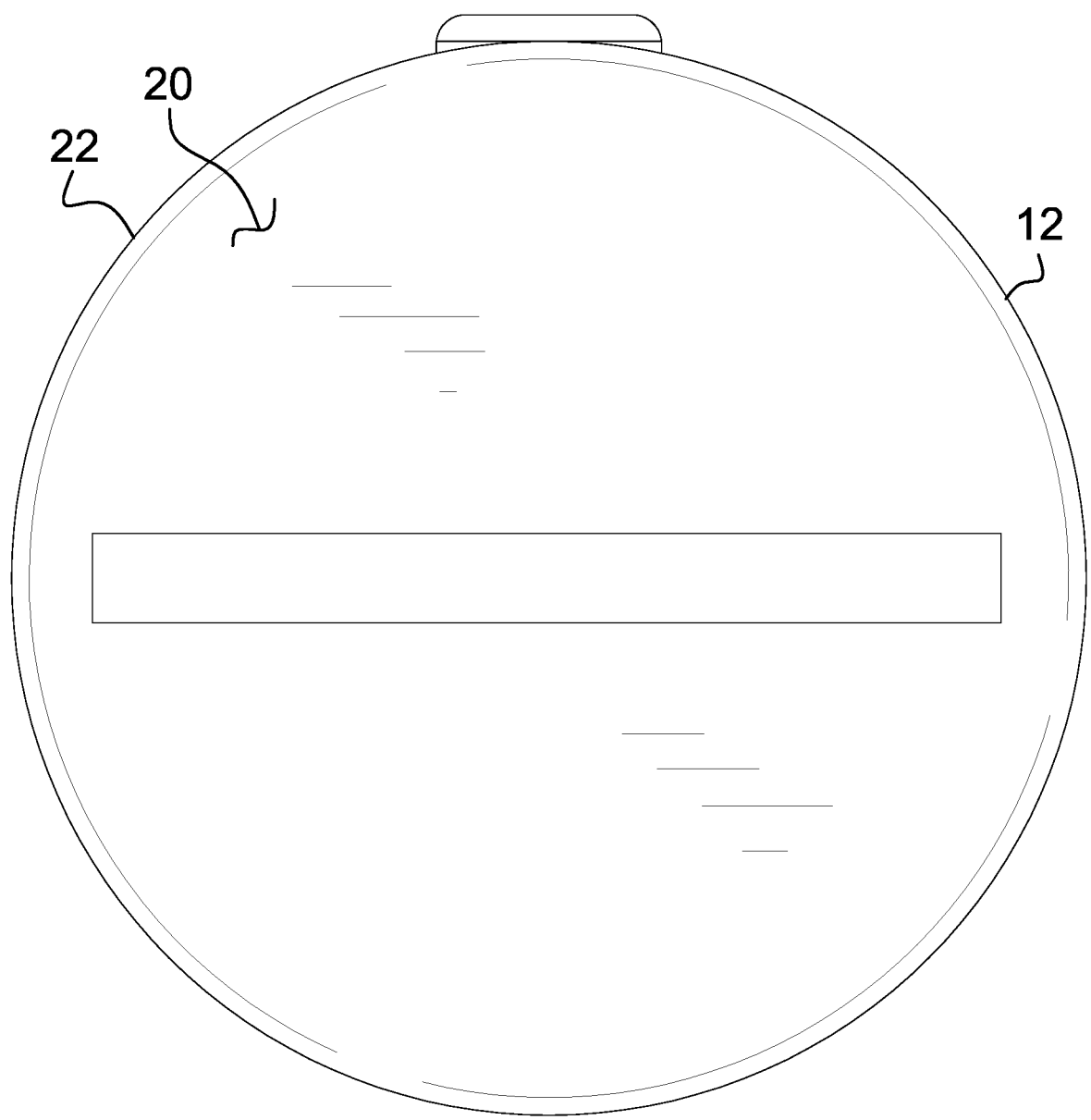
FIG. 5 is a bottom view of an embodiment of the disclosure.

With reference now to the drawings, and in particular to FIGS. 1 through 5 thereof, a new dispenser device embodying the principles and concepts of an embodiment of the disclosure and generally designated by the reference numeral 10 will be described.

As best illustrated in FIGS. 1 through 5, the piping bag dispenser assembly 10 generally comprises a disk 12 that has a receiver slot 14 extending through the disk 12 thereby facilitating a piping bag 16 to be inserted through the receiver slot 14. The piping bag 16 may be a piping bag of any conventional design that is employed for cake decorating. The disk 12 has a top surface 18, a bottom surface 20 and a perimeter surface 22 extending between the top surface 18 and the bottom surface 20, and the receiver slot 14 extends through the top surface 18 and the bottom surface 20. The receiver slot 14 is centrally positioned on the top surface 18 and the bottom surface 20, and the receiver slot 14 is elongated to extend substantially across the top surface 18 and the bottom surface 20. Additionally, the disk 12 has a pair of gear chambers 24 that is positioned between the top surface 18 and the bottom surface 20. Each of the gear chambers 24 is positioned on opposing sides of the receiver slot 14 from each other and each of the gear chambers 24 is elongated along the receiver slot 14. As is most clearly shown in FIGS. 2 and 3, the perimeter surface 22 may be concavely arcuate between the top surface 18 and the bottom surface 20 to enhance gripping the disk 12.

A dispensing unit 26 is provided and the dispensing unit 26 is rotatably integrated into the disk 12. The dispensing unit 26 is aligned with the receiver slot 14 thereby facilitating the dispensing unit 26 to frictionally engage the piping bag 16. The dispensing unit 26 urges the piping bag 16 through the receiver slot 14 when the dispensing unit 26 is turned on. In this way the dispensing unit 26 can urge icing 28 outwardly through the piping bag 16 for decorating a cake 29.

The dispensing unit 26 comprises a pair of urging gears 30 that each has a first end 32, a second end 34 and an exterior surface 36 extending between the first end 32 and the second end 34. Each of the urging gears 30 is elongated between the first end 32 and the second end 34, and each of the urging gears 30 is positioned in a respective one of the gear chambers 24 in the disk 12. Furthermore, each of the first end 32 and the second end 34 of each of the urging gears 30 rotatably engages a respective bounding surface 38 of the respective gear chamber 24. Each of the urging gears 30 is oriented to be coextensive with the receiver slot 14 and each of the urging gears 30 is positioned on opposing sides of the receiver slot 14 from each other. In this way the exterior surface 36 of each of the urging gears 30 is directed toward the receiver slot 14. Moreover, the exterior surface 36 of each of the urging gears 30 frictionally engages the piping bag 16 when the piping bag 16 is inserted through the receiver slot 14.

The dispensing unit 26 includes a pair of motors 40 that is each positioned within the disk 12. Each of the motors 40 has an output shaft 42 and the output shaft 42 of each of the motors 40 rotates in a first direction when each of the motors 40 is turned on. Additionally, each of the motors 40 is positioned adjacent to a respective one of the urging gears 30. Each of the motors 40 may comprise an electric motor or the like.

The dispensing unit 26 includes a pair of drive gears 44 that is each coupled to the output shaft 42 of a respective one of the motors 40. An outside surface 46 of each of the drive gears 44 engages the exterior surface 36 of a respective one of the urging gears 30. Each of the drive gears 44 rotates the respective urging gear 30 when the motors 40 are turned on. Each of the urging gears 30 is rotated in a first direction when the motors 40 are turned on. In this way the urging gears 30 urge the piping bag 16 upwardly between the urging gears 30 thereby compressing the piping bag 16 between the urging gears 30. Thus, each of the urging gears 30 squeezes the icing 28 outwardly from the piping bag 16 when the motors 40 are turned on.

A power supply 48 is integrated into the disk 12 and the power supply 48 is electrically coupled to each of the motors 40. The power supply 48 comprises a battery 50 that is positioned within the disk 12, and the battery 50 is electrically coupled to each of the motors 40. The power supply 48 includes a charging circuit 52 that is positioned within the disk 12 and the charging circuit 52 is electrically coupled to the battery 50. The power supply 48 includes a charge port 54 that is recessed into the perimeter surface 22 of the disk 12 to receive a charge cord 56. The charge port 54 is electrically coupled to the charging circuit 52 for charging the battery 50.

The power supply 48 includes a power button 58 that is movably integrated into the perimeter surface 22 of the disk 12. The power button 58 is electrically coupled to each of the motors 40 and the power button 58 is biased into an off position. The power button 58 is actuated into an on position when the power button 58 is depressed. Each of the motors 40 is turned on when the power button 58 is in the on position. Conversely, each of the motors 40 is turned off when the motor is biased into the off position.

In use, an upper end 60 of the piping bag 16 is inserted through the receiver slot 14 and the power button 58 is depressed. In this way the piping bag 16 is urged upwardly through the receiver slot 14. Thus, the piping bag 16 is compressed to urge the icing 28 outwardly through a lower end 62 of the piping bag 16. In this way a user can decorate the cake 29 with the icing 28 without experiencing hand fatigue that could result from manually squeezing the piping bag 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A piping bag dispenser assembly for automatically urging from a piping bag, said assembly comprising:

a disk having a receiver slot extending through said disk thereby facilitating a piping bag to be inserted through said receiver slot;

a dispensing unit being rotatably integrated into said disk, said dispensing unit being aligned with said receiver slot thereby facilitating said dispensing unit to frictionally engage the piping bag, said dispensing unit urging the piping bag through said receiver slot when said dispensing unit is turned on wherein said dispensing unit is configured to urge icing outwardly through the piping bag for decorating a cake;

wherein said disk has a top surface, a bottom surface and a perimeter surface extending between said top surface and said bottom surface, said receiver slot extending through said top surface and said bottom surface, said receiver slot being centrally positioned on said top surface and said bottom surface, said receiver slot being elongated to extend substantially across said top surface and said bottom surface;

wherein said disk has a pair of gear chambers being positioned between said top surface and said bottom surface, each of said gear chambers being positioned on opposing sides of said receiver slot from each other, each of said gear chambers being elongated along said receiver slot; and wherein said dispensing unit comprises a pair of urging gears, each of said urging gears having a first end, a second end and an exterior surface extending between said first end and said second end, each of said urging gears being elongated between said first end and said second end, each of said urging gears being positioned in a respective one of said gear chambers in said disk, each of said first end and said second end of each of said urging gears rotatably engaging a respective bounding surface of said respective gear chamber, and a pair of motors, each of said motors being positioned within said disk, each of said motors having an output shaft, said output shaft of each of said motors rotating in a first direction when each of said, motors is turned on, each of said motors being positioned adjacent to a respective one of said urging gears.

2. The assembly according to claim 1, wherein each of said urging gears is oriented to be coextensive with said receiver slot, each of said urging gears being positioned on opposing sides of said receiver slot from each other such that said exterior surface of each of said urging gears is directed toward said receiver slot, said exterior surface of each of said urging gears frictionally engaging the piping bag when the piping bag is inserted through said receiver slot.

3. The assembly according to claim 1, wherein said dispensing unit includes a pair of drive gears, each of said drive gears being coupled to said output shaft of a respective one of said motors, an outside surface of each of said drive gears engaging said exterior surface of a respective one of said urging gears, each of said drive gears rotating said respective urging gear when said motors are turned on.

4. The assembly according to claim 3, wherein each of said urging gears is rotated in a first direction when said motors are turned on thereby facilitating said urging gears to urge the piping bag upwardly between said urging gears thereby compressing the piping bag between said urging gears wherein each of said urging gears is configured to squeeze the icing outwardly from the piping bag when said motors are turned on.

5. The assembly according to claim 1, wherein said dispensing unit includes a power supply being integrated into said disk, said power supply being electrically coupled to each of said motors, said power supply comprising:

a battery being positioned within said disk, said battery being electrically coupled to each of said motors;

a charging circuit being positioned within said disk, said charging circuit being electrically coupled to said battery;

a charge port being recessed into said perimeter surface of said disk wherein said charge port is configured to receive a charge cord, said charge port being electrically coupled to said charging circuit for charging said battery; and a power button being movably integrated into said perimeter surface of said disk, said power button being electrically coupled to each of said motors, said power button being biased into an off position, said power button being actuated into an on position when said power button is depressed, each of said motors being turned on when said power button is in said on position, each of said motors being turned off when said motor is biased into said off position.

6. A piping bag dispenser assembly for automatically urging icing from a piping bag, said assembly comprising:

a disk having a receiver slot extending through said disk thereby facilitating a piping bag to be inserted through said receiver slot, said disk having a top surface, a bottom surface and a perimeter surface extending between said top surface and said bottom surface, said receiver slot extending through said top surface and said bottom surface, said receiver slot being centrally positioned on said top surface and said bottom surface, said receiver slot being elongated to extend substantially across said top surface and said bottom surface, said disk having a pair of gear chambers being positioned between said top surface and said bottom surface, each of said gear chambers being positioned on opposing sides of said receiver slot from each other, each of said gear chambers being elongated along said receiver slot; and a dispensing unit being rotatably integrated into said disk, said dispensing unit being aligned with said receiver slot thereby facilitating said dispensing unit to frictionally engage the piping bag, said dispensing unit urging the piping bag through said receiver slot when said dispensing unit is turned on wherein said dispensing unit is configured to urge icing outwardly through the piping bag for decorating a cake, said dispensing unit comprising:

a pair of urging gears, each of said urging gears having a first end, a second end and an exterior surface extending between said first end and said second end, each of said urging gears being elongated between said first end and said second end, each of said urging gears being positioned in a respective one of said gear chambers in said disk, each of said first end and said second end of each of said urging gears rotatably engaging a respective bounding surface of said respective gear chamber, each of said urging gears being oriented to be coextensive with said receiver slot, each of said urging gears being positioned on opposing sides of said receiver slot from each other such that said exterior surface of each of said urging gears is directed toward said receiver slot, said exterior surface of each of said urging gears frictionally engaging the piping bag when the piping bag is inserted through said receiver slot;

a pair of motors, each of said motors being positioned within said disk, each of said motors having an output shaft, said output shaft of each of said motors rotating in a first direction when each of said motors is turned on, each of said motors being positioned adjacent to a respective one of said urging gears;

a pair of drive gears, each of said drive gears being coupled to said output shaft of a respective one of said motors, an outside surface of each of said drive gears engaging said exterior surface of a respective one of said urging gears, each of said drive gears rotating said respective urging gear when said motors are turned on, each of said urging gears being rotated in a first direction when said motors are turned on thereby facilitating said urging gears to urge the piping bag upwardly between said urging gears thereby compressing the piping bag between said urging gears wherein each of said urging gears is configured to squeeze the icing outwardly from the piping bag when said motors are turned on; and a power supply being integrated into said disk, said power supply being electrically coupled to each of said motors, said power supply comprising:

a battery being positioned within said disk, said battery being electrically coupled to each of said motors;

a charging circuit being positioned within said disk, said charging circuit being electrically coupled to said battery;

a charge port being recessed into said perimeter surface of said disk wherein said charge port is configured to receive a charge cord, said charge port being electrically coupled to said charging circuit for charging said battery; and power button being movably integrated into said perimeter surface of said disk, said power button being electrically coupled to each of said motors, said power button being biased into an off position, said power button being actuated into an on position when said power button is depressed, each of said motors being turned on when said power button is in said on position, each of said motors being turned off when said motor is biased into said off position.

7. A piping bag dispenser system for automatically urging icing from a piping bag, said system comprising:

a piping bag being configured to contain icing for a cake, said piping bag having an upper end and a lower end, said lower end being open wherein said lower end is configured to dispense the icing;

a disk having a receiver slot extending through said disk thereby facilitating said upper end of said piping bag to be inserted through said receiver slot, said disk having a top surface, a bottom surface and a perimeter surface extending between said top surface and said bottom surface, said receiver slot extending through said top surface and said bottom surface, said receiver slot being centrally positioned on said top surface and said bottom surface, said receiver slot being elongated to extend substantially across said top surface and said bottom surface, said disk having a pair of gear chambers being positioned between said top surface and said bottom surface, each of said gear chambers being positioned on opposing sides of said receiver slot from each other, each of said gear chambers being elongated along said receiver slot; and a dispensing unit being rotatably integrated into said disk, said dispensing unit being aligned with said receiver slot thereby facilitating said dispensing unit to frictionally engage said piping bag, said dispensing unit urging said piping bag through said receiver slot when said dispensing unit is turned on wherein said dispensing unit is configured to urge the icing outwardly through said lower end of said piping bag for decorating a cake, said dispensing unit comprising:

a pair of urging gears, each of said urging gears having a first end, a second end and an exterior surface extending between said first end and said second end, each of said urging gears being elongated between said first end and said second end, each of said urging gears being positioned in a respective one of said gear chambers in said disk, each of said first end and said second end of each of said urging gears rotatably engaging a respective bounding surface of said respective gear chamber, each of said urging gears being oriented to be coextensive with said receiver skit, each of said urging gears being positioned on opposing sides of said receiver slot from each other such that said exterior surface of each of said urging gears is directed toward said receiver slot, said exterior surface of each of said urging gears frictionally engaging said piping bag when said piping bag is inserted through said receiver slot;

a pair of motors, each of said motors being positioned within said disk, each of said motors having an output shaft, said output shaft of each of said motors rotating in a first direction when each of said motors is turned on, each of said motors being positioned adjacent to a respective one of said urging gears;

a pair of drive gears, each of said drive gears being coupled to said output shaft of a respective one of said motors, an outside surface of each of said drive gears engaging said exterior surface of a respective one of said urging gears, each of said drive gears rotating said respective urging gear when said motors are turned on, each of said urging gears being rotated in a first direction when said motors are turned on thereby facilitating said urging gears to urge said piping bag upwardly between said urging gears thereby compressing said piping bag between said urging gears wherein each of said urging gears is configured to squeeze the icing outwardly from said lower end of said piping bag when said motors are turned on; and a power supply being integrated into said disk, said power supply being electrically coupled to each of said motors, said power supply comprising:

a battery being positioned within said disk, said battery being electrically coupled to each of said motors;

a charging circuit being positioned within said disk, said charging circuit being electrically coupled to said battery;

a charge port being recessed into said perimeter surface of said disk wherein said charge port is configured to receive a charge cord, said charge port being electrically coupled to said charging circuit for charging said battery; and a power button being movably integrated into said perimeter surface of said disk, said power button being electrically coupled to each of said motors, said power button being biased into an off position, said power button being actuated into an on position when said power button is depressed, each of said motors being turned on when said power button is in said on position, each of said motors being turned off when said motor is biased into said off position.

* * * * *